(12) United States Patent
Kooijman et al.

(10) Patent No.: US 8,215,907 B2
(45) Date of Patent: Jul. 10, 2012

(54) METHOD AND APPARATUS FOR CONTROLLING ACOUSTIC EMISSIONS OF A WIND TURBINE

(75) Inventors: Hendrikus J. T. Kooijman, Enschede (NL); Andreas Petersen, Salzbergen (DE); Markus Koschinsky, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/570,547

(22) Filed: Sep. 30, 2009

(65) Prior Publication Data

US 2010/0143119 A1  Jun. 10, 2010

(51) Int. Cl.
*F04D 29/66* (2006.01)

(52) U.S. Cl. .................. 416/1; 416/35; 416/37; 416/39; 416/61

(58) Field of Classification Search .............. 290/44, 290/55; 416/1, 35, 37, 39, 61
See application file for complete search history.

(56) References Cited

U.S. PATENT DOCUMENTS

| | | | |
|---|---|---|---|
| 6,688,841 B1 | 2/2004 | Wobben | |
| 6,785,637 B1 | 8/2004 | Wobben | |
| 6,940,185 B2 * | 9/2005 | Andersen et al. | 290/44 |
| 6,966,754 B2 * | 11/2005 | Wobben | 416/61 |
| 2007/0031237 A1 * | 2/2007 | Bonnet | 415/1 |
| 2007/0183885 A1 | 8/2007 | Ormel et al. | |
| 2007/0264121 A1 * | 11/2007 | Miller | 416/23 |
| 2008/0112807 A1 * | 5/2008 | Uphues et al. | 416/1 |
| 2008/0195255 A1 * | 8/2008 | Lutze et al. | 700/291 |

FOREIGN PATENT DOCUMENTS

| | | |
|---|---|---|
| DE | 199 26 553 A1 | 12/2000 |
| EP | 1 748 184 A2 | 1/2007 |
| EP | 1 873 395 A1 | 1/2008 |
| WO | 03/064853 A1 | 8/2003 |

OTHER PUBLICATIONS

Tom Levet, Environmental influences on the sound power level of a wind turbine, defined by the IEC 61400-11 standard, Thesis, Mar. 2008, 295 pages, University of Salford, Research Institute for the Built and Human Environment, Acoustics Research Centre.
European Search Report issued in connection with EP Application No. 10179697.7, Aug. 28, 2011.

* cited by examiner

*Primary Examiner* — Edward Look
*Assistant Examiner* — Sean J Younger
(74) *Attorney, Agent, or Firm* — James McGinness, Esq.; Armstrong Teasdale LLP (57) ABSTRACT

A method and an apparatus for monitoring an acoustic emission of a wind turbine that includes a rotor blade. The apparatus includes at least one sensor operatively coupled to the wind turbine. The sensor is configured to detect an atmospheric condition. A control system is communicatively coupled to the sensor, and configured to control operation of the wind turbine to adjust the acoustic emission of the wind turbine based on the atmospheric condition.

20 Claims, 4 Drawing Sheets

METHOD AND APPARATUS FOR CONTROLLING ACOUSTIC EMISSIONS OF A WIND TURBINE

BACKGROUND OF THE INVENTION

The subject matter disclosed herein relates generally to wind turbines and, more particularly, to methods and apparatus for controlling acoustic emissions of a wind turbine.

Wind turbines have been receiving increased attention for being environmentally safe and relatively inexpensive alternative energy sources. With the growing interest in alternative energy sources, considerable efforts have been made to develop wind turbines that are reliable and efficient. Although wind turbines do not emit greenhouse gases, a growing concern related to wind turbines is the emission of noise pollution. As such, the ability to control and/or manage perceived acoustic emissions of wind turbines facilitates integrating wind turbines into society.

A known method for determining sound emissions of a wind turbine is the IEC 61400-11 standard. More specifically, the IEC 61400-11 standard uses a microphone positioned on the ground a predetermined distance away from the wind turbine to determine at least a sound level and a sound power level of the wind turbine. Notably, determining sound emissions using known methods such as the IEC 61400-11 standard generally involves a relatively large margin of error.

Accordingly, it is desirable to provide a method and/or system for determining acoustic emissions of a wind turbine and controlling and/or managing perceived acoustic emissions of the wind turbine based on the determined acoustic emissions.

BRIEF DESCRIPTION OF THE INVENTION

In one aspect, a method is provided for monitoring an acoustic emission of a wind turbine that includes a rotor having at least one rotor blade, at least one sensor operatively coupled to the wind turbine, and a control system communicatively coupled to the sensor. The method includes detecting an atmospheric condition using the sensor and controlling operation of the wind turbine using the control system to adjust the acoustic emission of the wind turbine based on the atmospheric condition.

In another aspect, an apparatus is provided for controlling an acoustic emission of a wind turbine that includes a rotor having at least one rotor blade. The apparatus includes at least one sensor operatively coupled to the wind turbine. The sensor is configured to detect an atmospheric condition. A control system is communicatively coupled to the sensor, and configured to control operation of the wind turbine to adjust the acoustic emission of the wind turbine based on the atmospheric condition.

In yet another aspect, a wind farm is provided. The wind farm includes a plurality of wind turbines with a rotor having at least one rotor blade. At least one sensor is operatively coupled to each wind turbine. The sensor is configured to detect an atmospheric condition. A control system is communicatively coupled to the sensor, and configured to control operation of each wind turbine to adjust the acoustic emission of each wind turbine based on the atmospheric condition.

The following detailed description of certain embodiments of the present invention will be better understood when read in conjunction with the appended drawings. To the extent that the drawings illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION OF THE INVENTION

The methods and systems described herein facilitate controlling acoustic emissions of a wind turbine. Using various determinations, including an initial atmospheric condition and other data associated with attenuation and propagation of acoustic emissions, an operation of the wind turbine is controlled to adjust the acoustic emission of the wind turbine. For example, to adjust the acoustic emission of the wind turbine, a rotor speed may be increased and/or decreased, a nacelle may be rotated about a yaw axis, and/or a rotor blade may be rotated about a pitch axis.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a purpose other than generating electrical power including, without limitation, pumping a fluid and/or grinding a substance. As used herein, the term "wind farm" is intended to be representative of a plurality of wind turbines that are grouped together.

Figure 1:
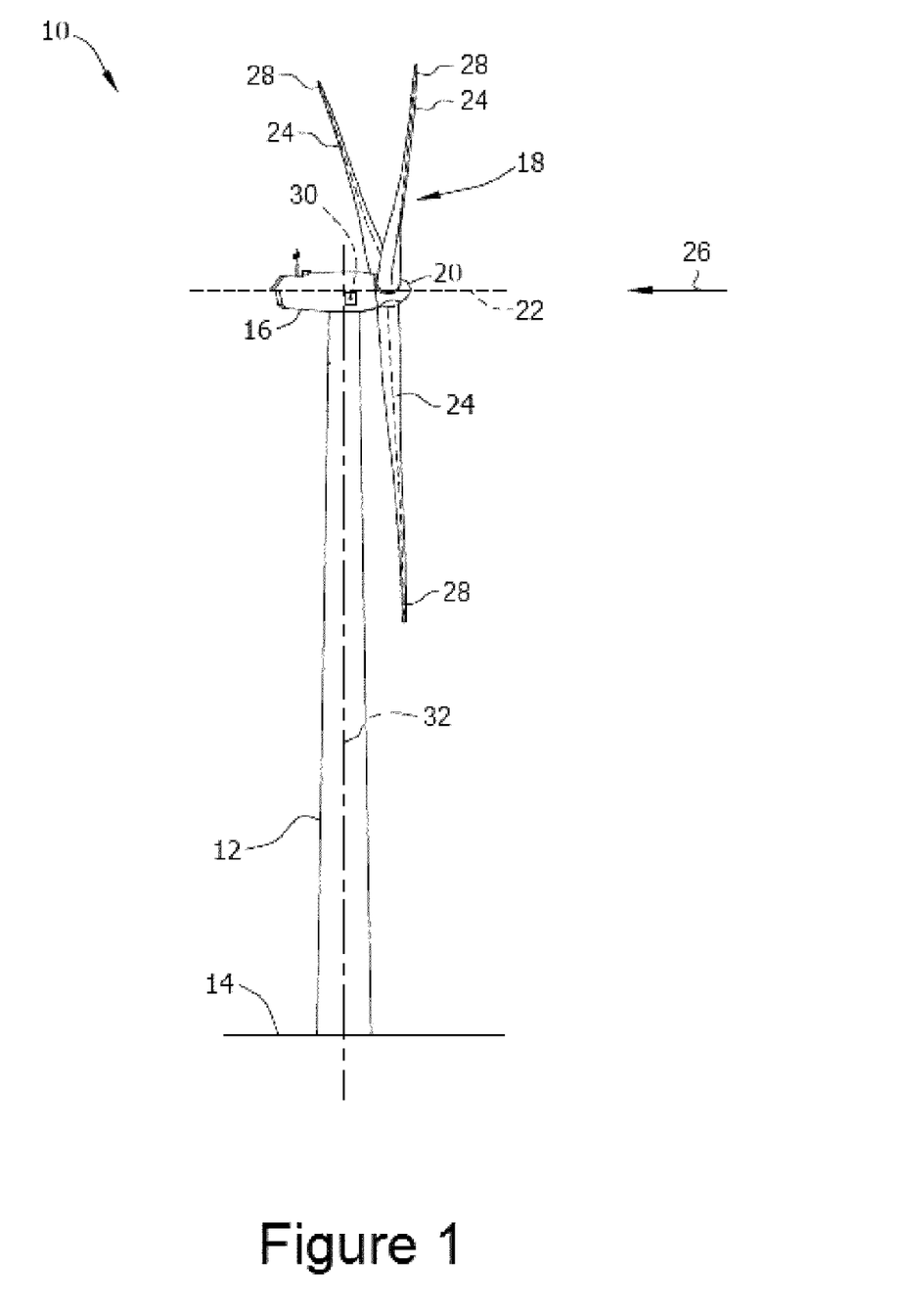
FIG. 1 is a perspective view of an exemplary wind turbine.
Figure 2:
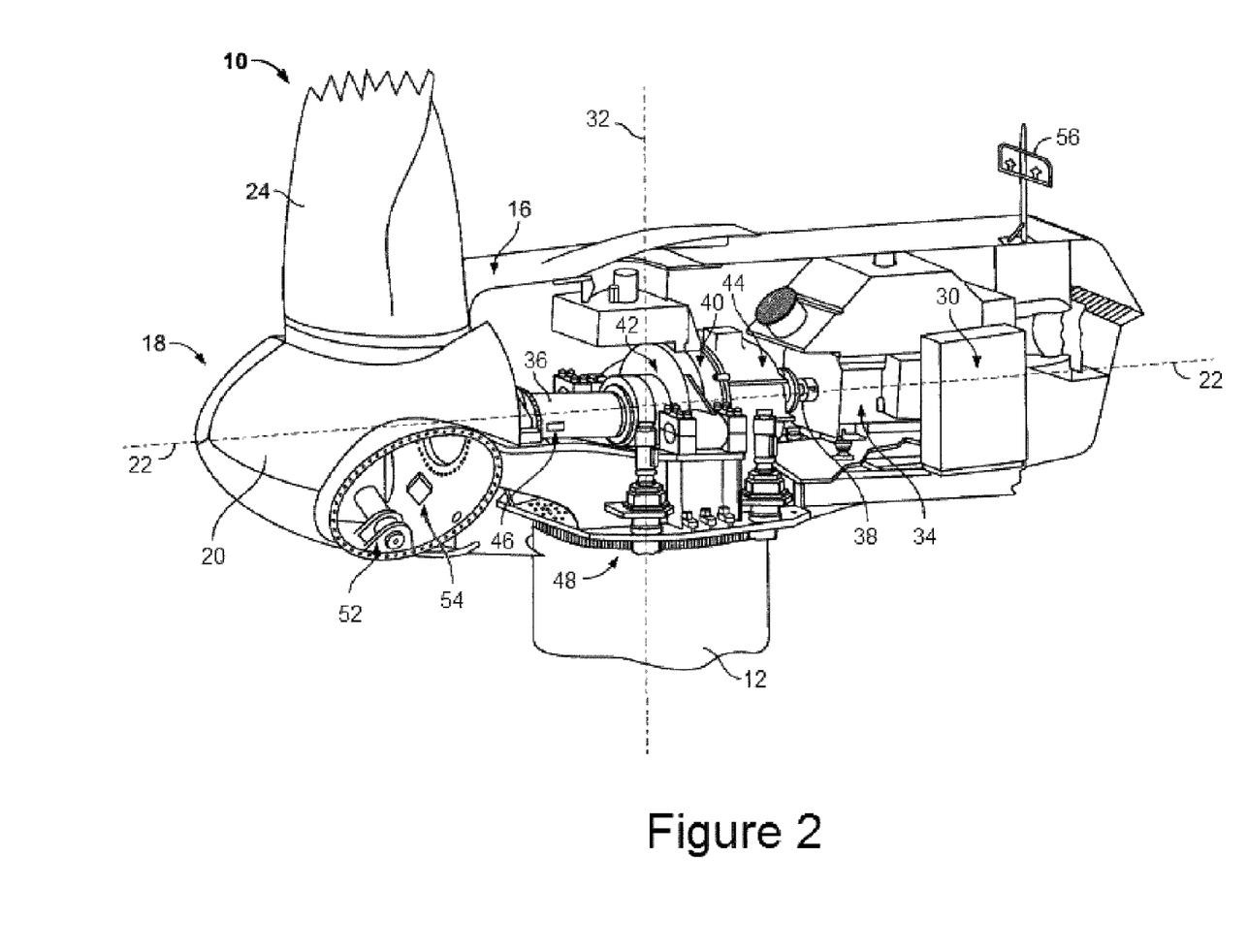
FIG. 2 is a perspective view of an exemplary nacelle suitable for use with the wind turbine shown in FIG. 1.
Figure 3:
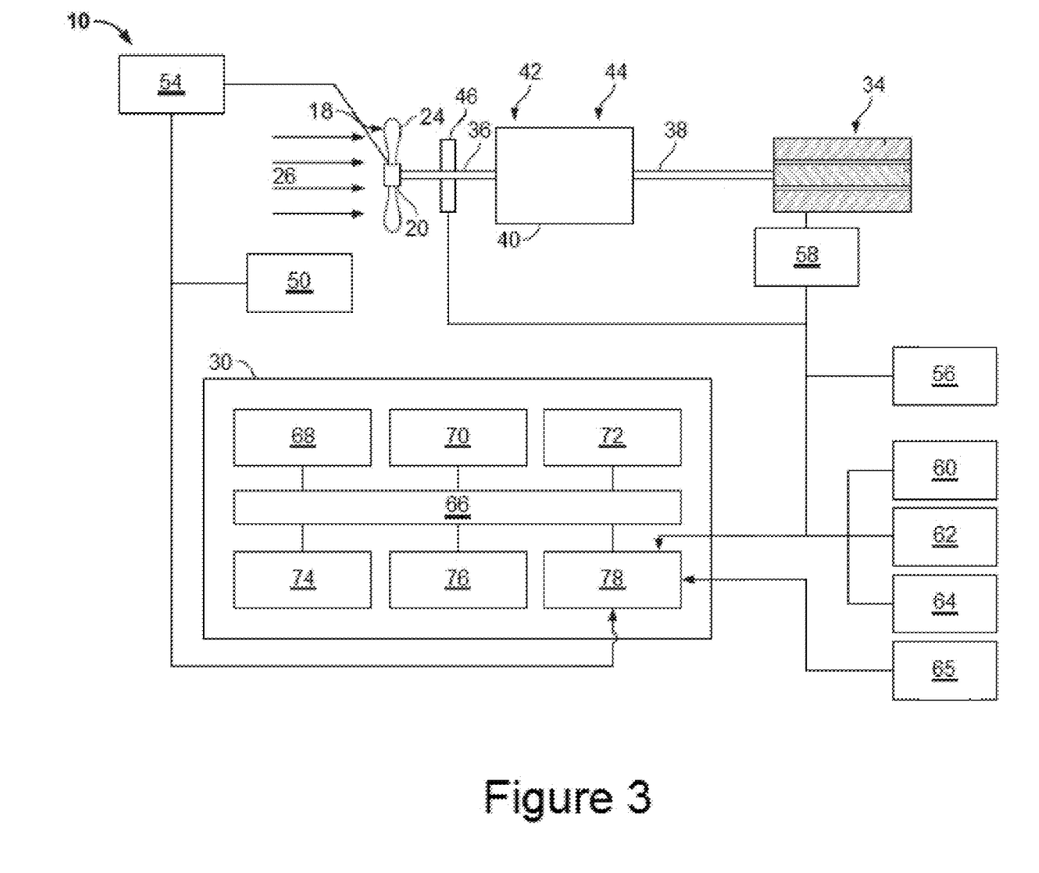
FIG. 3 is an electrical schematic diagram of the wind turbine shown in FIG. 1.

FIG. 1 is a perspective view of an exemplary wind turbine 10. Wind turbine 10 described and illustrated herein is a wind generator for generating electrical power from wind energy. Alternatively, wind turbine 10 may be any type of wind turbine. Although only one wind turbine 10 is shown in FIGS. 1-3, in some embodiments, a plurality of wind turbines 10 may be grouped as a wind farm.

In the exemplary embodiment, wind turbine 10 is a nearly horizontal-axis wind turbine. Alternatively, wind turbine 10 may have any suitable tilt angle. In the exemplary embodiment, wind turbine 10 includes a tower 12 that extends from a supporting surface 14, a nacelle 16 mounted on tower 12, and a rotor 18 that is coupled to nacelle 16. In the exemplary embodiment, rotor 18 includes a hub 20 rotatable about an axis of rotation 22 and at least one rotor blade 24 coupled to and extending outwardly from hub 20. In the exemplary embodiment, rotor 18 includes three rotor blades 24. Alternatively, rotor 18 may include any suitable number of rotor blades 24. In the exemplary embodiment, tower 12 is fabricated from tubular steel such that a cavity (not shown in FIG. 1) is defined between supporting surface 14 and nacelle 16. Alternatively, tower 12 may be any suitable type of tower and may be fabricated from any suitable material. A height of tower 12 may be any suitable height enabling wind turbine 10 to function as described herein.

In the exemplary embodiment, rotor blades 24 are spaced about hub 20 to facilitate rotating rotor 18 to enable kinetic energy to be transferred from the wind into usable mechanical energy, and subsequently, electrical energy. Loads induced to rotor blades 24 are transferred to hub 20. In the exemplary embodiment, rotor blades 24 have a length ranging from about 0.5 meters (m) to greater than 100 m. Alternatively, rotor blades 24 may have any suitable length that enables wind turbine 10 to function as described herein. Notably, blades 24 may be of any shape, type, and/or any configuration. In the exemplary embodiment, wind turbine 10 may include rotor 18 that generally faces upwind to harness wind energy and/or downwind to harness wind energy. Alternatively, rotor 18 may be positioned at any angle (which may be variable) with respect to direction 26 of the wind to harness wind energy therefrom.

In the exemplary embodiment, as wind strikes rotor blades 24 from direction 26, rotor 18 is rotated about axis of rotation 22. Alternatively, wind may strike rotor blades 24 from a plurality of directions 26 and/or at various wind shears, wind gradients, and turbulence intensities. As used throughout this detailed description and in the claims, wind shear is a combination of wind velocity and wind direction over a relatively short distance in the atmosphere. More specifically, wind shear provides a vertical and/or horizontal profile of wind velocity and wind direction at a given location. As used throughout this detailed description and in the claims, wind gradient is a vertical gradient of a mean horizontal wind speed in the lower atmosphere. More specifically, wind gradient provides a rate of increase of wind strength with unit increase in height above a given level. As used throughout this detailed description and in the claims, turbulence intensity characterizes an intensity of gusts in the air flow. More specifically, turbulence intensity provides a ratio of the root-mean-square of the eddy velocity to the mean wind speed.

In the exemplary embodiment, as rotor blades 24 are rotated and subjected to centrifugal forces, rotor blades 24 are also subjected to various forces and moments. As such, rotor blades 24 may deflect and/or rotate from a neutral, or non-deflected, position to a deflected position. Moreover, a pitch angle of rotor blades 24, i.e., an angle that determines a perspective of rotor blades 24 with respect to direction 26 of the wind, may be changed by a pitch adjustment system (shown in FIG. 2) to control power generated by wind turbine 10 by adjusting an angular position of a profile of at least one rotor blade 24 relative to wind vectors. Pitch axes 28 are illustrated. In the exemplary embodiment, a pitch angle of each rotor blade 24 is controlled individually by a control system 30. Alternatively, a pitch angle for all rotor blades 24 may be controlled simultaneously by control system 30. In the exemplary embodiment, control system 30 is shown as being centralized within nacelle 16. Alternatively, control system 30 may be a distributed system throughout wind turbine 10, on supporting surface 14, within a wind farm, and/or at a remote control center.

In the exemplary embodiment, control system 30 is communicatively coupled to a plurality of the components of wind turbine 10 for generally monitoring and controlling operation of wind turbine 10 and/or some or all of the components thereof. For example, in the exemplary embodiment, as direction 26 changes, a yaw direction of nacelle 16 may be controlled about a yaw axis 32 to position rotor blades 24 with respect to direction 26. Moreover, control system 30 may be used to monitor and control the overall system including, without limitation, pitch and speed regulation, high-speed shaft and yaw brake application, yaw and pump motor application, fault monitoring and/or acoustic emission regulation. For example, control system 30 may automatically calibrate operation of wind turbine 10 based on an initial atmospheric condition and other data associated with attenuation and propagation of acoustic emissions. Alternative distributed or centralized control architectures may be used in certain embodiments.

In the exemplary embodiment, control system 30 includes a processor, as shown in FIG. 3, that is configured to perform the methods and/or steps described herein. Further, other components described herein may include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and/or a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, acoustic emission control commands. The execution of sequences of instructions is not limited to any specific combination of hardware circuitry and software instructions.

Referring now to FIGS. 2 and 3, wind turbine 10 includes an electrical generator 34 coupled to rotor 18 for generating electrical power from the rotational energy generated by rotor 18. In the exemplary embodiment, rotor 18 includes a rotor shaft 36 coupled to hub 20 for rotation therewith. In the exemplary embodiment, a generator rotor shaft 38 is rotatably coupled to rotor shaft 36 through a gearbox 40. More specifically, in the exemplary embodiment, gearbox 40 has a low speed side 42 rotatably coupled to rotor shaft 36 and a high speed side 44 rotatably coupled to generator rotor shaft 38.

In certain embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 34. In the exemplary embodiment, wind turbine 10 includes at least one sensor 46 coupled to rotor shaft 36 for measuring a speed of rotation of rotor shaft 36 and/or a torque of rotor shaft 36. Sensor 46 may be any suitable sensor including, without limitation, optical encoders, digital proximity sensors, piezo-electric transducers, strain gages, and/or tachometers having any suitable location within or remote to wind turbine 10. In the exemplary embodiment, sensor 46 is coupled in electronic data communication to control system 30 for transmitting measurement signals to control system 30 for processing and/or receiving suitable signals from control system 30.

In the exemplary embodiment, as shown in FIG. 2, wind turbine 10 includes a yaw system 48 for rotating nacelle 16 about yaw axis 32 for changing a yaw of rotor 18. More specifically, yaw system 48 rotates nacelle 16 for changing wind direction 26 faced by rotor 18 to adjust, for example, an angle between the direction faced by rotor 18 and a direction of wind. In the exemplary embodiment, yaw system 48 is coupled in electronic data communication to control system 30 to receive control command signals from control system 30 to control operation of yaw system 48. In the exemplary embodiment, wind turbine 10 includes at least one sensor 50 coupled to yaw system 48 for measuring an orientation of nacelle 16, or more specifically an angle of nacelle 16 with respect to wind direction 26. Sensor 50 may be any suitable sensor including, but without limitation, optical encoders positioned within yaw system 48 having any suitable location within or remote to wind turbine 10. In the exemplary embodiment, sensors 50 are coupled in electronic data communication to control system 30 for transmitting pitch measurement signals to control system 30 for processing and/or receiving suitable signals from control system 30.

In the exemplary embodiment, wind turbine 10 includes a variable blade pitch system 52 for controlling a pitch angle of rotor blades 24 with respect to wind direction 26. In the exemplary embodiment, variable blade pitch system 52 is coupled to control system 30 for control thereby. In the exemplary embodiment, variable blade pitch system 52 includes one or more actuators (not shown) coupled to hub 20 and/or rotor blades 24 for changing a pitch angle of rotor blades 24 by rotating rotor blades 24 with respect to hub 20 about pitch axis 28. The pitch actuators may include any suitable structure, configuration, arrangement, means, and/or components, whether described and/or illustrated herein, such as electrical motors, hydraulic cylinders, springs, and/or servomechansims. Moreover, the pitch actuators may be driven by any suitable means, whether described and/or illustrated herein, including, without limitation, hydraulic fluid, electrical power, electro-chemical power, and/or mechanical power, such as spring force. For example, in certain embodiments, the pitch actuators include a pitch drive gear (not shown) that is coupled to a pitch ring gear (not shown). The pitch ring gear is coupled to rotor blade 24 such that rotation of the pitch drive gear rotates rotor blade 24 about pitch axis 28 to thereby change a pitch angle of rotor blade 24.

In the exemplary embodiment, wind turbine 10 also includes a plurality of sensors 54, each coupled to a corresponding rotor blade 24 for measuring a pitch angle of each rotor blade 24, or more specifically, an angle of each rotor blade 24 with respect to wind direction 26 and/or with respect to hub 20. Sensors 54 may be any suitable sensor having any suitable location within or remote to wind turbine 10, such as, but not limited to, optical encoders within pitch system 52. In the exemplary embodiment, sensors 54 are coupled in electronic data communication to control system 30 for sending pitch measurement signals to control system 30 for processing and/or receiving suitable signals from control system 30.

In the exemplary embodiment, wind turbine 10 also includes at least one anemometer 56 for measuring wind speed and/or wind direction. In a particular embodiment, wind turbine 10 is coupled to a plurality of anemometers 56 at a plurality of locations proximate to and/or remote from wind turbine 10 at one or more heights. In the exemplary embodiment, one or more anemometers 56 are coupled in electronic data communication to control system 30 for sending measurement signals to control system 30 for processing and/or receiving suitable signals from control system 30. In the exemplary embodiment, one or more anemometers 56 are configured to detect a plurality of wind conditions including, without limitation, wind direction, wind velocity, wind shear, wind gradient, and turbulence intensity.

In the exemplary embodiment, anemometer 56 is coupled in electronic data communication to control system 30 for sending measurement data thereto for controlling other operations of wind turbine 10. For example, anemometer 56 may send measurement signals to control system 30 for controlling and/or changing a yaw of rotor 18 using yaw system 48. Alternatively, anemometer 56 may be coupled in electronic data communication directly to yaw system 48 for controlling and/or changing a yaw of rotor 18.

In the exemplary embodiment, wind turbine 10 also includes at least one sensor 58 coupled to generator 34 for measuring an electrical power output of generator 34. In the exemplary embodiment, sensor 58 is coupled in electronic data communication to control system 30 for sending measurement signals to control system 30 for processing and/or receiving suitable signals from control system 30. Sensor 58 may be any suitable sensor including, without limitation, Hall effect current transducers (CTs) and/or capacitive voltage transducers (CVTs) having any suitable location within or remote to wind turbine 10.

In the exemplary embodiment, wind turbine 10 includes at least one sensor 60 configured to measure ambient air pressure. Sensor 60 may be any suitable sensor including, without limitation, one or more electric barometric pressure measurement instruments having any suitable location within or remote to wind turbine 10. In the exemplary embodiment, sensor 60 is coupled in electronic data communication to control system 30 for sending ambient air pressure measurement signals to control system 30 for processing and/or receiving suitable signals from control system 30.

In the exemplary embodiment, wind turbine 10 includes at least one sensor 62 configured to measure ambient air temperature. Sensor 62 may be any suitable sensor including, without limitation, one or more electronic thermometers having any suitable location within or remote to wind turbine 10. In the exemplary embodiment, sensor 62 is coupled in electronic data communication to control system 30 for sending ambient air temperature measurement signals to control system 30 for processing and/or receiving suitable signals from control system 30.

In the exemplary embodiment, wind turbine 10 includes at least one sensor 64 configured to measure ambient air humidity. Sensor 64 may be any suitable sensor including, without limitation, one or more electronic relative humidity sensors having any suitable location within or remote to wind turbine 10. In the exemplary embodiment, sensor 64 is coupled in electronic data communication to control system 30 for sending ambient air humidity measurement signals to control system 30 for processing and/or receiving suitable signals from control system 30.

In the exemplary embodiment, wind turbine 10 includes at least one sensor 65 configured to measure an acoustic emission. Sensor 65 may be any suitable sensor including, without limitation, one or more microphones having any suitable location within or remote to wind turbine 10. Alternatively, sensor 65 may be positioned at various locations proximate to and/or remote from wind turbine 10. For example, sensor 65 may be positioned proximate to locations including one or more of a house, a town, and a metropolitan area. In the exemplary embodiment, sensor 65 is coupled in electronic data communication to control system 30 for sending acoustic emission measurement signals to control system 30 for processing and/or receiving suitable signals from control system 30.

Wind turbine 10 may also include one or more additional sensors (not shown) coupled to one or more components of wind turbine 10 and/or the electrical load, whether such component(s) are described or illustrated herein, for measuring parameters of such component(s) and/or for measuring other ambient conditions. Such sensor(s) may include, without limitation, sensors configured to measure any ambient condition, any operational parameter of any wind turbine component, displacement, yaw, pitch, moments, strain, stress, twist, damage, failure, rotor torque, rotor speed, an anomaly in the electrical load, and/or an anomaly of power supplied to any component of wind turbine 10. Such sensors may be coupled to any component of wind turbine 10 and/or the electrical load at any location thereof for measuring any parameter thereof, whether such component, location, and/or parameter is described and/or illustrated herein, and may be used to derive other measurements, e.g., viscosity, as known in the art.

Referring further to FIG. 3, in the exemplary embodiment, control system 30 includes a bus 66 or other communications device to communicate information between various components of control system 30. At least one processor 68 is coupled to bus 66 to process information, including information from anemometer 56, sensors 46, 50, 54, 58, 60, 62 64, and/or 65, and/or one or more other sensors. In the exemplary embodiment, control system 30 also includes at least one random access memory (RAM) 70 and/or other storage device 72. RAM 70 and storage device 72 are coupled to bus 66 to store and transfer information and instructions to be executed by processor 68. RAM 70 and/or storage device 72 can also be used to store temporary variables or other intermediate information during execution of instructions by processor 68. In the exemplary embodiment, control system 30 also includes at least one read only memory (ROM) 74 and/or other static storage devices coupled to bus 66 to store and provide static (i.e., non-changing) information and instructions to processor 68. In the exemplary embodiment, control system 30 further includes at least one input/output device 76 that facilitates providing input data to control system 30 and/or providing outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media and other components. In certain embodiments, hard-wired circuitry can be used in place of or in combination with software instructions. Thus, execution of sequences of instructions is not limited to any specific combination of hardware circuitry and software instructions, whether described and/or illustrated herein. In the exemplary embodiment, control system 30 also includes at least one sensor interface 78 that allows control system 30 to communicate with anemometer 56, sensors 46, 50, 54, 58, 60, 62 64, and/or 65, and/or one or more other sensors. Sensor interface 78 includes, for example, one or more analog-to-digital converters that convert analog signals into digital signals that can be used by processor 68.

Figure 4:
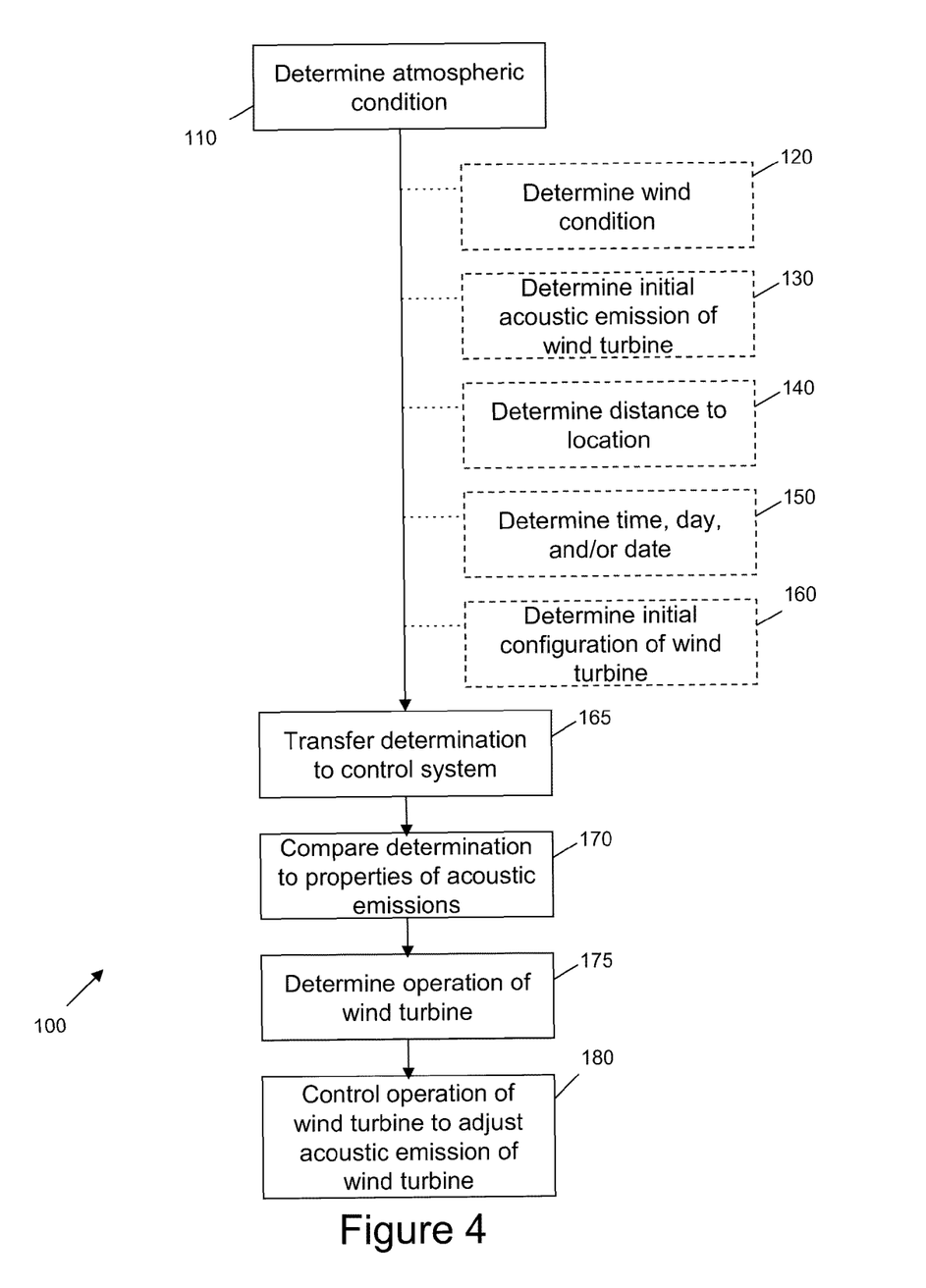
FIG. 4 is a flowchart illustrating an exemplary method for controlling the wind turbine shown in FIG. 1.

FIG. 4 is a flowchart illustrating an exemplary method 100 for controlling a wind turbine, such as wind turbine 10 shown in FIGS. 1, 2 and 3. In the exemplary embodiment, method 100 includes determining one or more various criteria such as an atmospheric condition 110, a wind condition 120, an initial acoustic emission 130 of wind turbine 10, a distance to a location 140, a time, a day, and/or a date 150, and an initial configuration 160 of wind turbine 10. Additionally, control system 30 may store determination 110, 120, 130, 150, and/or 160 to automatically calibrate and/or determine 175 operation of wind turbine 10 based on determination 110, 120, 130, 150, 160 and/or other data associated with attenuation and propagation of acoustic emissions. In the exemplary embodiment, determination 110, 120, 130, 140, 150, and/or 160 are determined in a continuous and dynamic manner via at least one algorithm and statically stored electronically within a table (not shown) that is maintained within control system 30. Alternatively, such values may be derived dynamically using at least one algorithm.

More specifically, in the exemplary embodiment, determining atmospheric condition 110 includes detecting an ambient air pressure, an ambient air temperature, and/or an ambient humidity using sensor 60, 62, and 64, respectively. Alternatively, determining atmospheric condition 110 may include detecting a rate of rain fall, an ambient air viscosity, and other ambient atmospheric conditions. In the exemplary embodiment, at least one sensor 60, 62, and/or 64 detects an atmospheric condition and transfers 165 data associated with the detected atmospheric condition to control system 30.

In the exemplary embodiment, determining wind condition 120 includes detecting a wind velocity, a wind direction, a wind shear, a wind gradient, and/or a turbulence intensity using anemometer 56. In the exemplary embodiment, anemometer 56 detects a wind condition and transfers 165 data associated with the detected wind condition to control system 30.

In the exemplary embodiment, determining initial acoustic emission 130 of wind turbine 10 includes detecting a sound level at a location proximate to wind turbine 10 using sensor 65. Alternatively, determining initial acoustic emission 130 includes detecting a perceived sound level at a location remote from wind turbine 10 using sensor 65. In the exemplary embodiment, sensor 65 detects an acoustic emission and transfers 165 data associated with the detected acoustic emission to control system 30.

In the exemplary embodiment, determining distance to a location 140 includes determining a location affected by sound emissions of wind turbine 10. In certain embodiments, the location is a point of observation including one or more of a house, a suburban area, an urban area, and another wind turbine 10. In the exemplary embodiment, control system 30 includes data associated with various distances and/or orientations to various locations, and control system 30 determines a location based on other determined criteria such as determination 110, 120, 130, 150, and/or 160. Alternatively, a sensor detects a distance and/or an orientation to a location and transfers 165 data associated with the detected distance and/or orientation to control system 30.

In the exemplary embodiment, determining time 150 includes determining at least one of a time of day, a time of week, and/or a time of year. In the exemplary embodiment, control system 30 includes a clock and/or calendar (not shown) that are configured to determine a time. In the exemplary embodiment, control system 30 includes a schedule associated with various times, days, and/or dates that have an increased and/or a decreased tolerance for acoustic emissions. For example, the hours between 8:00 PM and 8:00 AM may be times that are programmed for reduced acoustic emissions.

In the exemplary embodiment, determining initial configuration 160 of wind turbine 10 includes detecting a speed of rotor 18, an orientation of rotor 18, and/or a pitch angle of at least one rotor blade 24 using sensor 46, 50, and/or 54, respectively. In the exemplary embodiment, at least one of sensor 46, 50, and/or 54 detects an initial configuration of wind turbine 10 and transfers 165 data associated with the detected initial configuration to control system 30. Additionally, determining initial configuration 160 of wind turbine 10 may include determining a height of wind turbine 10, detecting an electrical power output using sensor 58, and/or other configurations of wind turbine 10. In the exemplary embodiment, control system 30 includes data associated with various configurations of wind turbine 10.

Method 100 includes comparing 170 any combination of determination 110, 120, 130, 140, 150, and 160 to properties of acoustic emissions. Sound may travel and/or be perceived differently in various atmospheric conditions. Control system 30 further includes data associated with various properties of sound in various atmospheric conditions. For example, if wind shear is high, rotor speed of wind turbine 10 may be reduced to compensate for a low background noise level at a point of observation. Moreover, ground properties such as, but not limited to, soil properties, terrain, foliage, buildings, and/or other features of the surrounding area may influence various properties of sound. Based on the comparison of any combination of determination 110, 120, 130, 140, 150, and 160 to various properties of sound, an operation of wind turbine 10 is controlled 180 to increase or decrease an acoustic emission of wind turbine 10.

For example, control system 30 may transmit operation signals to adjust a brake torque and/or a pitch angle to increase and/or decrease a rotation speed of rotor 18. Moreover, control system 30 may transmit operation signals to yaw system 48 for rotating nacelle 16 to reorient rotor 18 about yaw axis 32. Furthermore, control system may transmit operation signals to variable blade pitch system 52 for increasing and/or decreasing a pitch angle of at least one rotor blade 24.

In the exemplary embodiment, control system 30 may create a parameter matrix including a plurality of footprints associated with various determinations 110, 120, 130, 140, 150, and/or 160. More specifically, in the exemplary embodiment, control system 30 may store a plurality of operation signals used for a plurality of determinations 110, 120, 140, 150, and/or 160 in a database and calibrate and/or determine 175 operation of wind turbine 10 based on the plurality of stored operation signals and/or other data associated with the attenuation and propagation of acoustic emissions.

For example, control system 30 may create a first footprint associating a first combination of determinations 110, 120, 130, 140, 150, and/or 160 with a first operational setting. When control system 30 receives a second footprint, including a second combination of determinations 110, 120, 130, 140, 150, and/or 160, that is similar to those of the first footprint, control system 30 may operate wind turbine 10 using the first operational setting and/or calibrate operation of wind turbine 10 based on a comparison of the first and second footprints.

More specifically, in the exemplary embodiment, control system 30 may compare a perceived sound emission resulting from a first footprint with a perceived sound emission resulting from a second footprint. Control system 30 determines whether the operation signals associated with the first footprint are used to operate wind turbine 10 or the operation signals associated with the first footprint are calibrated in light of the second footprint. As such, control system 30 operates and/or calibrates wind turbine 10 such that operation of wind turbine 10 under similar determinations 110, 120, 130, 140, 150, and/or 160 emits a similar perceived sound emission.

Exemplary embodiments of the wind turbine and methods for assembling the wind turbine are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with wind turbines as described herein. Rather, the present invention can be implemented and utilized in connection with many other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring an acoustic emission of a wind turbine that includes a rotor having at least one rotor blade, at least one sensor operatively coupled to the wind turbine, and a control system communicatively coupled to the sensor, said method comprising:

detecting an atmospheric condition using a first sensor at a first location, the atmospheric condition including at least one of a wind shear and a wind gradient;

detecting an acoustic emission using a second sensor at a second location; and, controlling operation of the wind turbine including an orientation of the wind turbine using the control system to adjust a perceived acoustic emission of the wind turbine at a third location based on the acoustic emission detected using the second sensor and at least one of the wind shear, the wind gradient, and an initial orientation of the wind turbine.

2. A method in accordance with claim 1, wherein detecting an atmospheric condition comprises detecting at least one of a turbulence intensity, an ambient pressure, an ambient temperature, and an ambient humidity.

3. A method in accordance with claim 1, further comprising:
detecting an initial acoustic emission using the second sensor; and,
controlling operation of the wind turbine using the control system to adjust the perceived acoustic emission of the wind turbine based on a distance and a direction of the second sensor relative to the wind turbine and the initial acoustic emission.

4. A method in accordance with claim 1, wherein controlling operation of the wind turbine comprises controlling operation of the wind turbine based on a distance from the wind turbine to the third location.

5. A method in accordance with claim 1, wherein controlling operation of the wind turbine comprises controlling operation of the wind turbine based on a schedule associated with at least one of a time of day, a time of week, and a time of year.

6. A method in accordance with claim 1, wherein controlling operation of the wind turbine comprises controlling at least one of a rotor speed and a pitch of the rotor blade based on at least one of an initial rotor speed and an initial pitch of the rotor blade.

7. A method in accordance with claim 1, wherein controlling operation of the wind turbine comprises controlling operation of the wind turbine based on a parameter matrix including a plurality of footprints.

8. An apparatus for controlling an acoustic emission of a wind turbine that includes a rotor having at least one rotor blade, said apparatus comprising:
a first sensor operatively coupled to the wind turbine, the first sensor configured to detect an atmospheric condition at a first location including at least one of a wind shear and a wind gradient;
a second sensor configured to detect an acoustic emission at a second location; and,
a control system communicatively coupled to the first sensor and the second sensor, said control system configured to control operation of the wind turbine including an orientation of the wind turbine to adjust a perceived acoustic emission of the wind turbine at a third location based on the acoustic emission detected using the second sensor and at least one of the wind shear, the wind gradient, and an initial orientation of the wind turbine.

9. An apparatus in accordance with claim 8, wherein the first sensor is further configured to detect an atmospheric condition that includes at least one of a turbulence intensity, an ambient pressure, an ambient temperature, and an ambient humidity.

10. An apparatus in accordance with claim 8, wherein the second sensor is further configured to detect an initial acoustic emission, and the control system is further configured to control operation of the wind turbine to adjust the perceived acoustic emission of the wind turbine based on a distance and a direction of the second sensor relative to the wind turbine and the initial acoustic emission.

11. An apparatus in accordance with claim 8, wherein the control system is further configured to control operation of the wind turbine based on a distance from the wind turbine to the third location.

12. An apparatus in accordance with claim 8, wherein the control system is further configured to control operation of the wind turbine based on a schedule associated with at least one of a time of day, a time of week, and a time of year.

13. An apparatus in accordance with claim 8, wherein the control system is further configured to control operation of the wind turbine based on a parameter matrix including a plurality of footprints.

14. An apparatus in accordance with claim 8, wherein the control system is further configured to control at least one of a rotor speed and a pitch of the rotor blade based on at least one of an initial rotor speed and an initial pitch of the rotor blade.

15. A wind farm, comprising:
a plurality of wind turbines;
a plurality of first sensors operatively coupled to the plurality of wind turbines, each first sensor of the plurality of first sensors configured to detect an atmospheric condition including at least one of a wind shear and a wind gradient;
a second sensor configured to detect an acoustic emission at a second location; and,
a control system communicatively coupled to each first sensor of the plurality of first sensors and the second sensor, said control system configured to control operation of each wind turbine of the plurality of wind turbines including an orientation of each wind turbine of the plurality of wind turbines to adjust a perceived acoustic emission of each wind turbine of the plurality of wind turbines at a third location based on at least one of the wind shear, the wind gradient, and an initial orientation of each wind turbine of the plurality of wind turbines.

16. A wind farm in accordance with claim 15, wherein the atmospheric condition includes at least one of a turbulence intensity, an ambient pressure, an ambient temperature, and an ambient humidity.

17. A wind farm in accordance with claim 15, wherein the second sensor is further configured to detect an initial acoustic emission, and the control system is further configured to control operation of each wind turbine of the plurality of wind turbines to adjust the perceived acoustic emission of each wind turbine of the plurality of wind turbines based on a distance and a direction of the second sensor relative to the wind turbine and the initial acoustic emission.

18. A wind farm in accordance with claim 15, wherein the control system is further configured to control operation of each wind turbine of the plurality of wind turbines based on a distance from each wind turbine of the plurality of wind turbines to the third location.

19. A wind farm in accordance with claim 15, wherein the control system is further configured to control operation of each wind turbine of the plurality of wind turbines based on a schedule associated with at least one of a time of day, a time of week, and a time of year.

20. A wind farm in accordance with claim 15, wherein the control system is further configured to control operation of each wind turbine of the plurality of wind turbines based on a parameter matrix including a plurality of footprints.

* * * * *